United States Patent
Jou et al.

(10) Patent No.: US 10,314,250 B2
(45) Date of Patent: Jun. 11, 2019

(54) BAG PACKAGING MECHANISM FOR MUSHROOM CULTIVATION

(71) Applicants: Rong-Yuan Jou, Taichung (TW); Chih-Jen Lee, Taichung (TW)

(72) Inventors: Rong-Yuan Jou, Taichung (TW); Chih-Jen Lee, Taichung (TW)

(73) Assignee: National Formosa University, Yun-Lin Hsien (TW)

( * ) Notice: Subject to any disclaimer, the term of this patent is extended or adjusted under 35 U.S.C. 154(b) by 515 days.

(21) Appl. No.: 14/979,599

(22) Filed: Dec. 28, 2015

(65) Prior Publication Data

US 2017/0181380 A1    Jun. 29, 2017

(51) Int. Cl.

| | |
|---|---|
| *A01G 18/64* | (2018.01) |
| *B65B 53/00* | (2006.01) |
| *B65B 25/02* | (2006.01) |
| *A01G 22/00* | (2018.01) |
| *B65B 31/04* | (2006.01) |

(52) U.S. Cl.
CPC .............. *A01G 18/64* (2018.02); *A01G 22/00* (2018.02); *B65B 25/02* (2013.01); *B65B 31/042* (2013.01); *B65B 31/044* (2013.01); *B65B 53/00* (2013.01)

(58) Field of Classification Search
CPC ........ A01G 18/64; A01G 22/00; B65B 25/02; B65B 53/00

USPC ......... 53/403, 416, 417, 428, 432, 434, 436, 53/476

See application file for complete search history.

(56) References Cited

U.S. PATENT DOCUMENTS

| | | | | |
|---|---|---|---|---|
| 4,027,427 A | * | 6/1977 | Stoller | .................. A01G 18/64 47/1.1 |
| 4,418,513 A | * | 12/1983 | Plahm | .................. B65B 31/042 53/373.2 |
| 6,477,820 B1 | * | 11/2002 | Dutra | ...................... B65B 43/30 53/412 |
| 7,066,337 B2 | * | 6/2006 | Hsu | .................... B01D 46/0002 210/452 |

* cited by examiner

*Primary Examiner* — Chelsea E Stinson

(57) ABSTRACT

The present invention discloses a bag packing mechanism for mushroom cultivation, which comprises two clamping seats, transport means, air duct, pumping means and push rod. Transport means supply collar. Air duct descends through the collar and extends into a bag from the opening of the bag, the two clamping seats clamp the top portion of the bag to close to the outer periphery of the air duct, the pumping means sucks the top portion, the two clamping seats open, the push rod is lowered to push down the collar to put on the top portion, the pumping means blow to open the top portion, the push rod is further lowered to fold the top portion down, the air duct and putter rise, and then complete the automation of packaging job.

2 Claims, 10 Drawing Sheets

BAG PACKAGING MECHANISM FOR MUSHROOM CULTIVATION

BACKGROUND OF THE INVENTION

1. Fields of the Invention

The present invention relates to a bag automatic packing mechanism and method for mushroom cultivation, especially to a bag automatic packing mechanism and method for mushroom cultivation.

2. Descriptions of Related Art

According to the conventional bag packaging way of the production process of mushroom cultivation, the culture medium is filled in a bag, the top portion of the bag is shrink, sleeved collar and folded down, and then inject fungus of mushroom into the culture medium from the opening of the bag, and then put cotton at the opening to close the bag. However, the conventional bag packaging way for shrinking bag, mounting collar and folding bag are manual operation but not automatic operation, so as to increase labor costs.

The present invention intends to provide an adjustment device to eliminate the shortcomings mentioned above.

SUMMARY OF THE INVENTION

The main object of the present invention is to provide a bag automatic packing mechanism for mushroom cultivation, which comprises two clamping seats, transport means, air duct, pumping means and push rod. Transport means supply collar. Air duct descends through the collar and extends into the bag from the opening of the bag, the two clamping seats clamp the top portion of the bag to close to the outer periphery of the air duct, the pumping means sucks the top portion, the two clamping seats open, the push rod is lowered to push down the collar to put on the top portion, the pumping means blow to open the top portion, the push rod is further lowered to fold the top portion down, the air duct and putter rise, and then complete the automation of packaging job.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
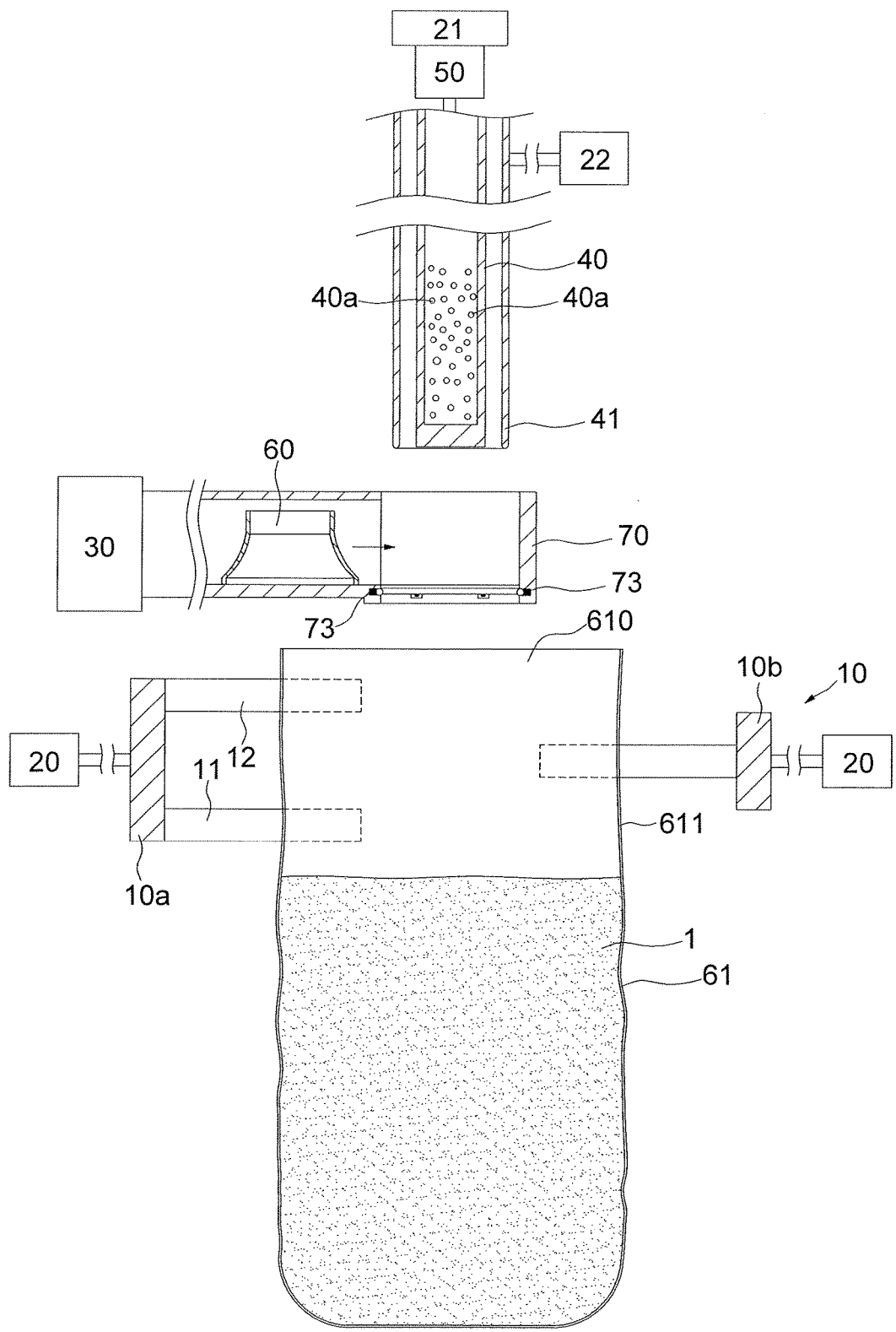
FIG. 1 is a construction of the present invention.
Figure 2:
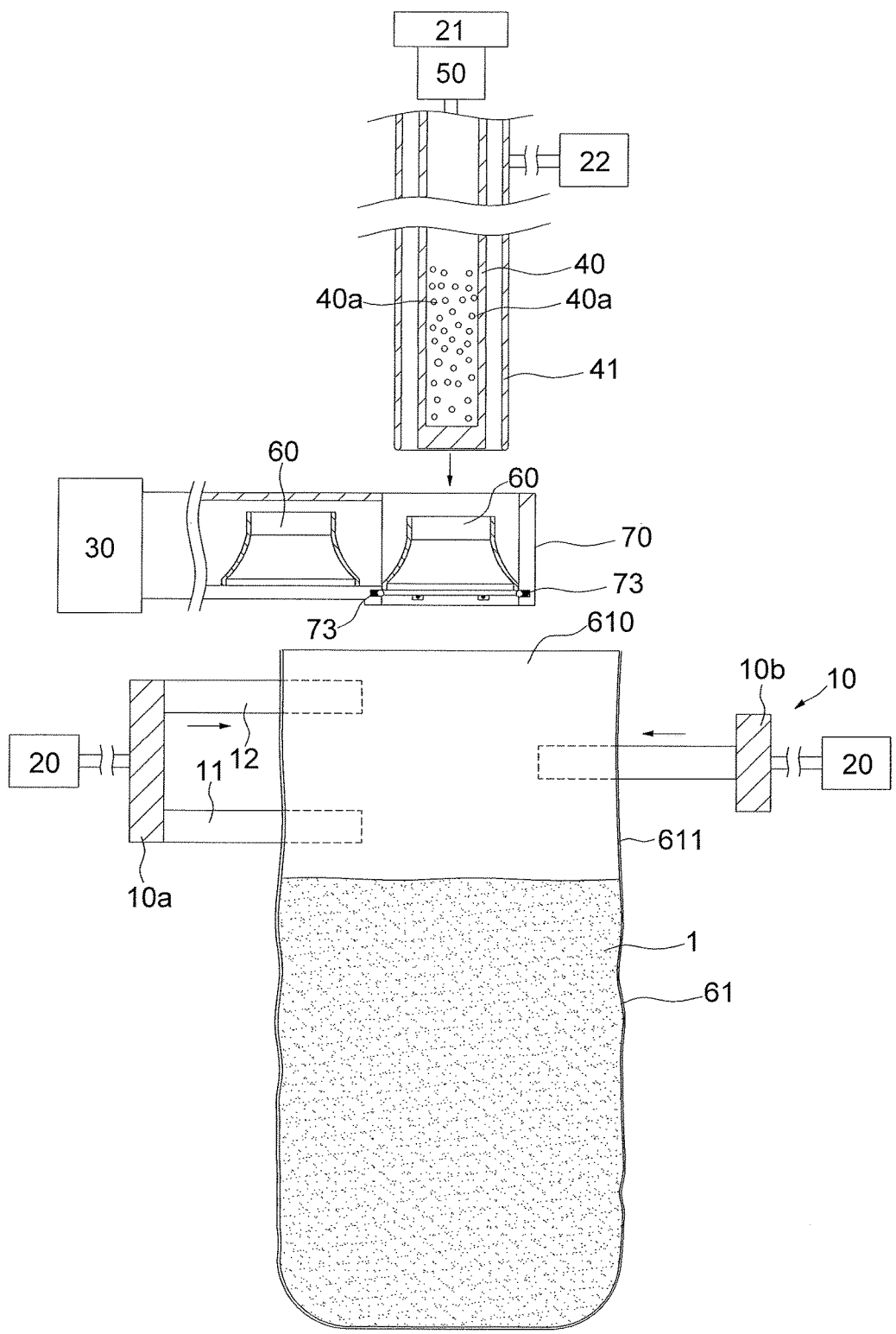
FIG. 2 is a first action status of the present invention.
Figure 3:
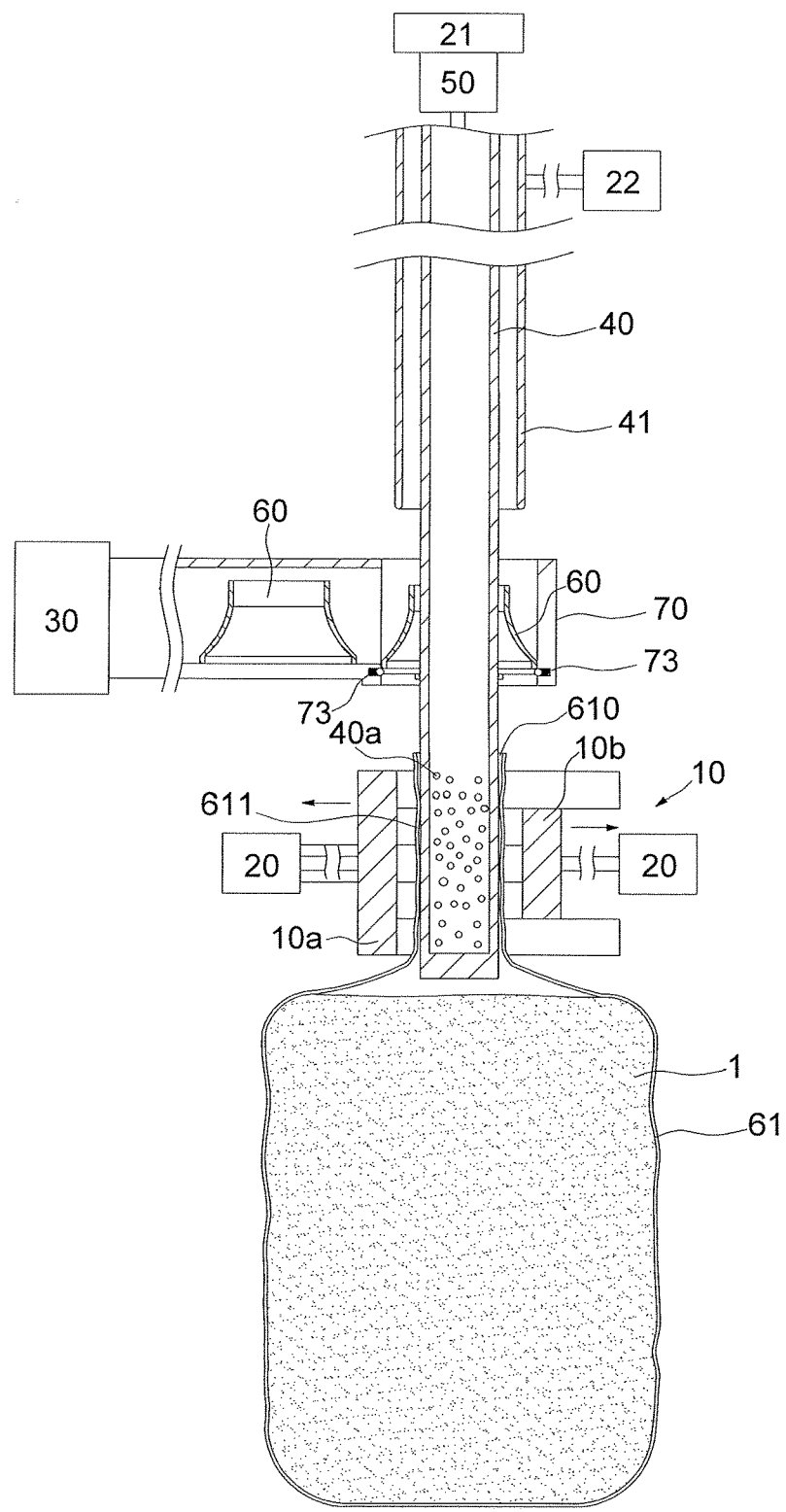
FIG. 3 is a first action status of the present invention.
Figure 4:
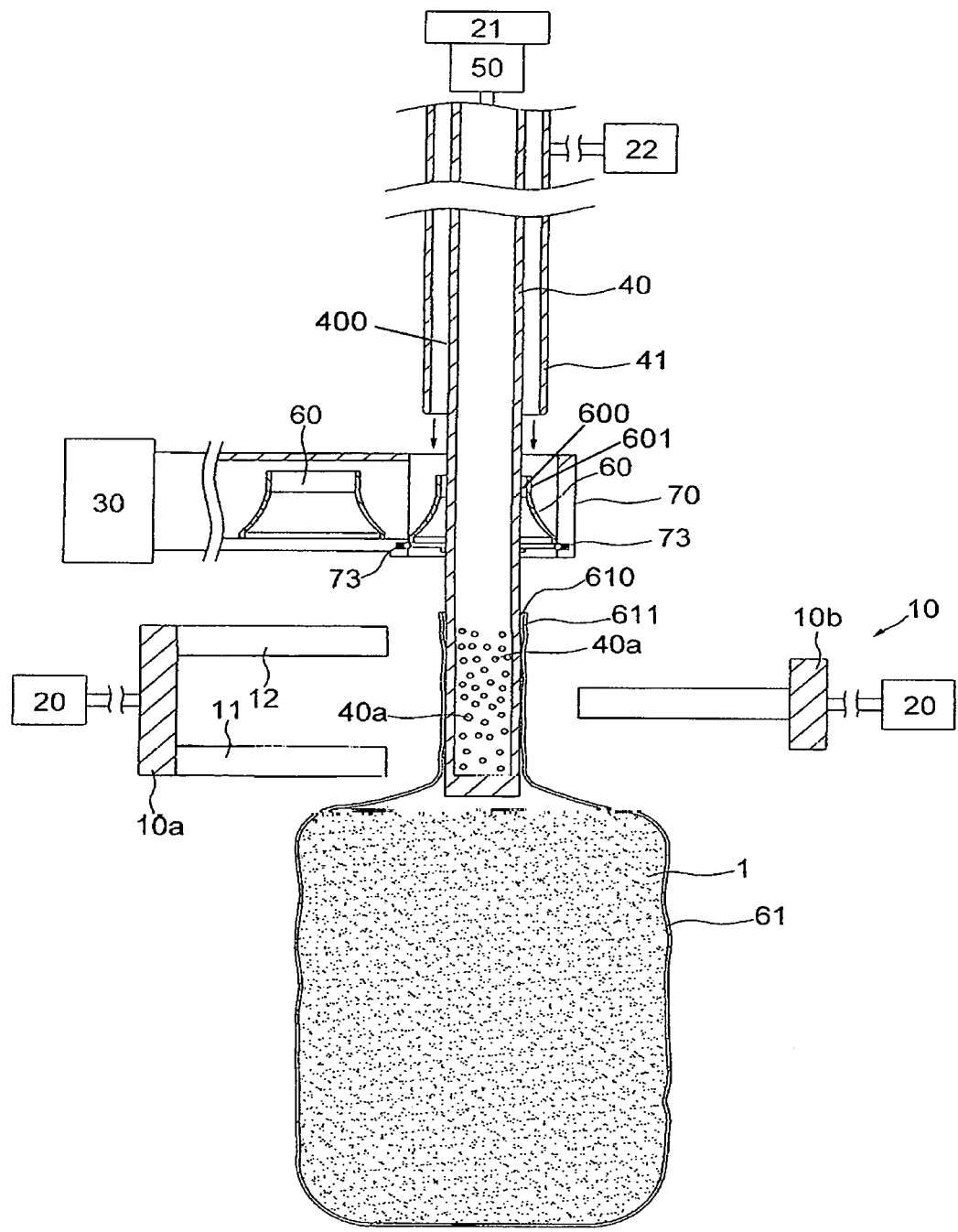
FIG. 4 is a first action status of the present invention.
Figure 5:
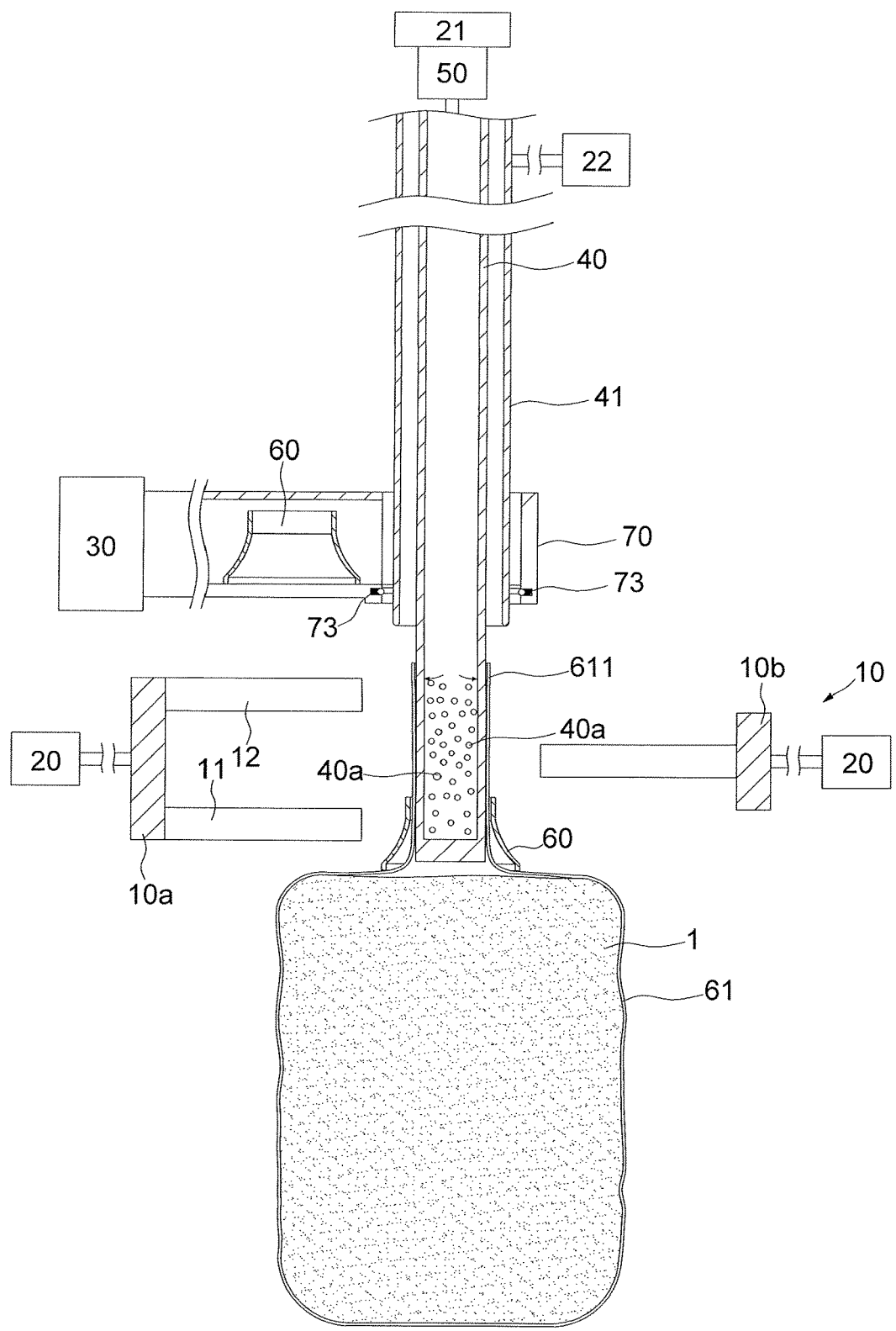
FIG. 5 is a first action status of the present invention.
Figure 6:
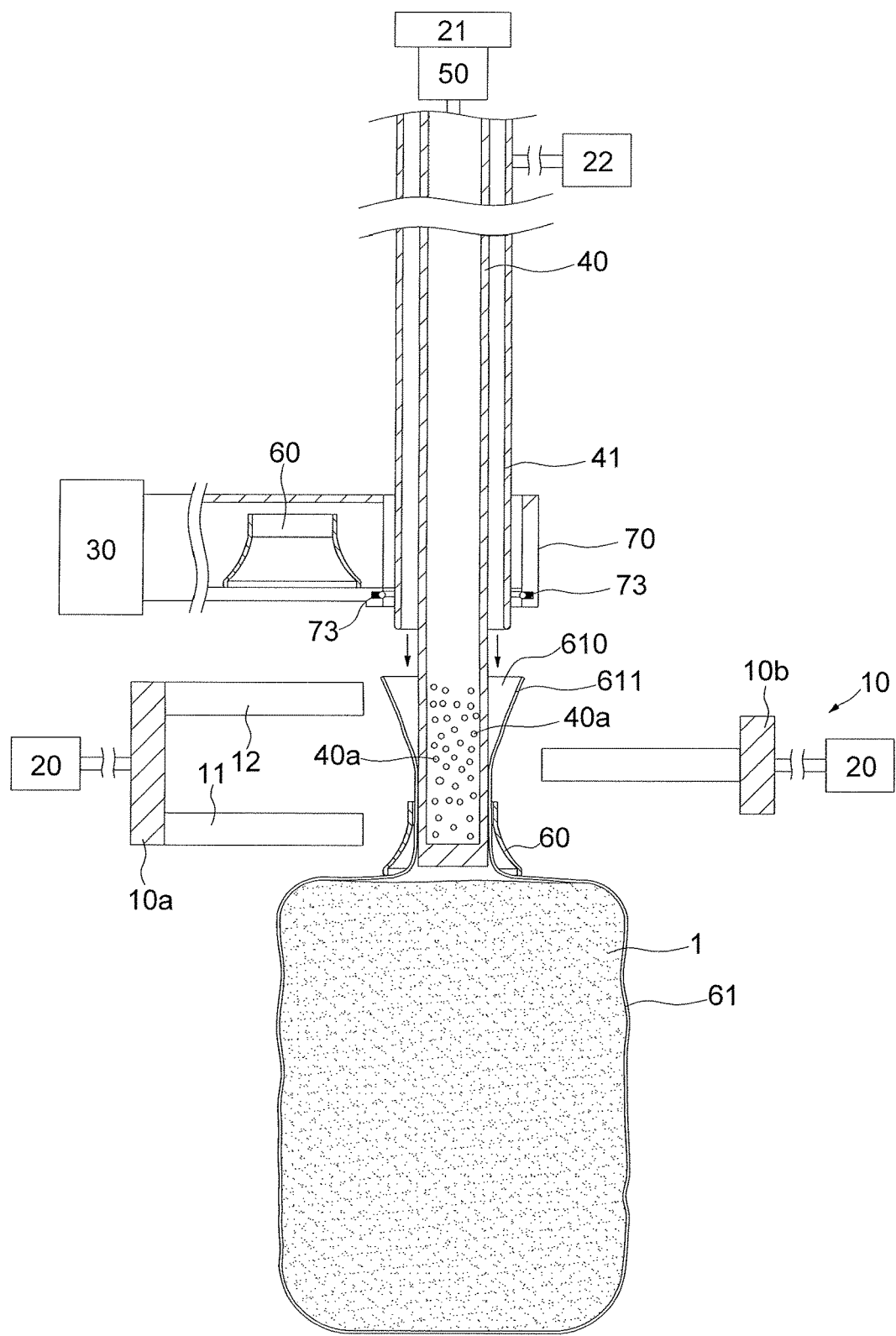
FIG. 6 is a first action status of the present invention.
Figure 7:
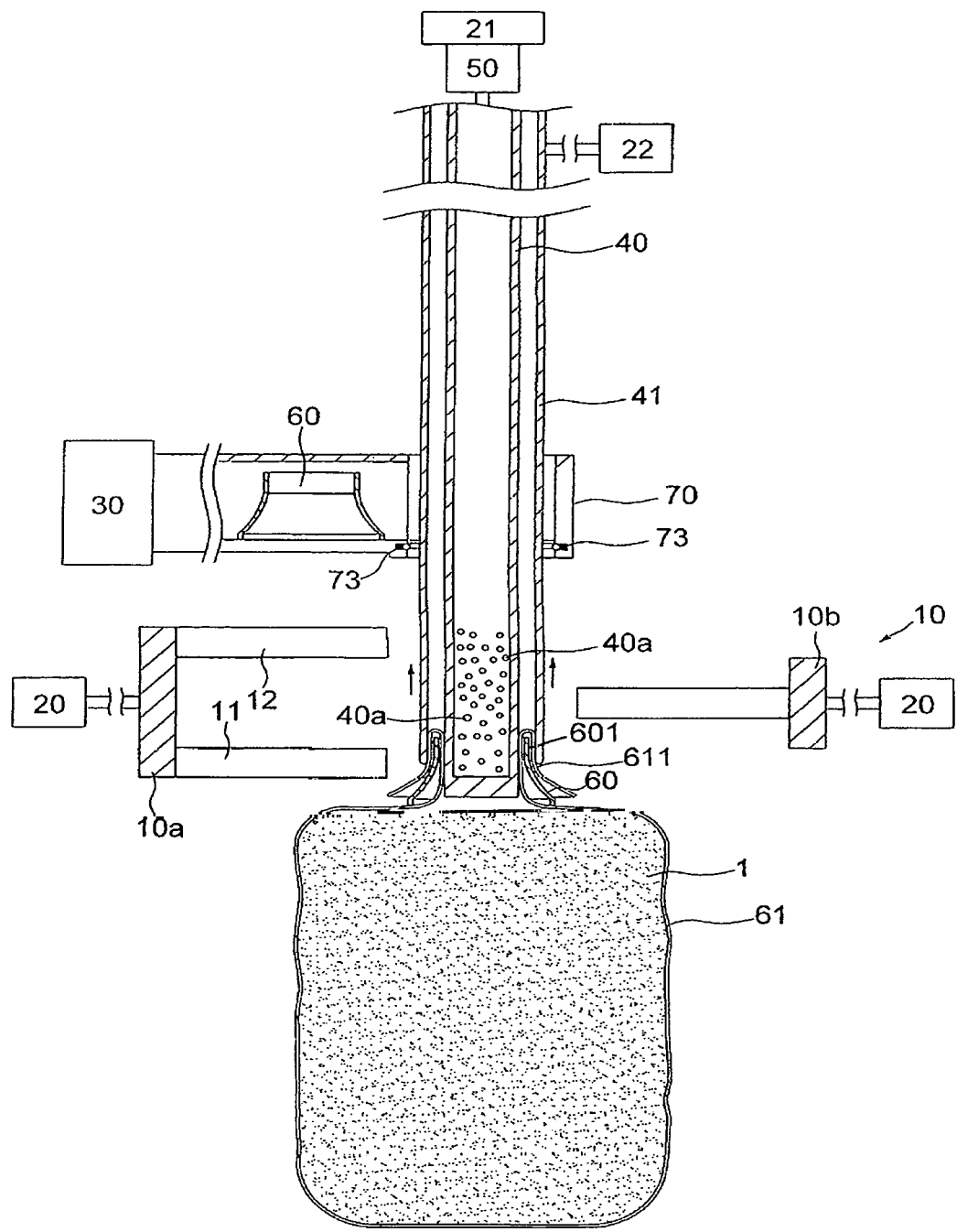
FIG. 7 is a first action status of the present invention.
Figure 8:
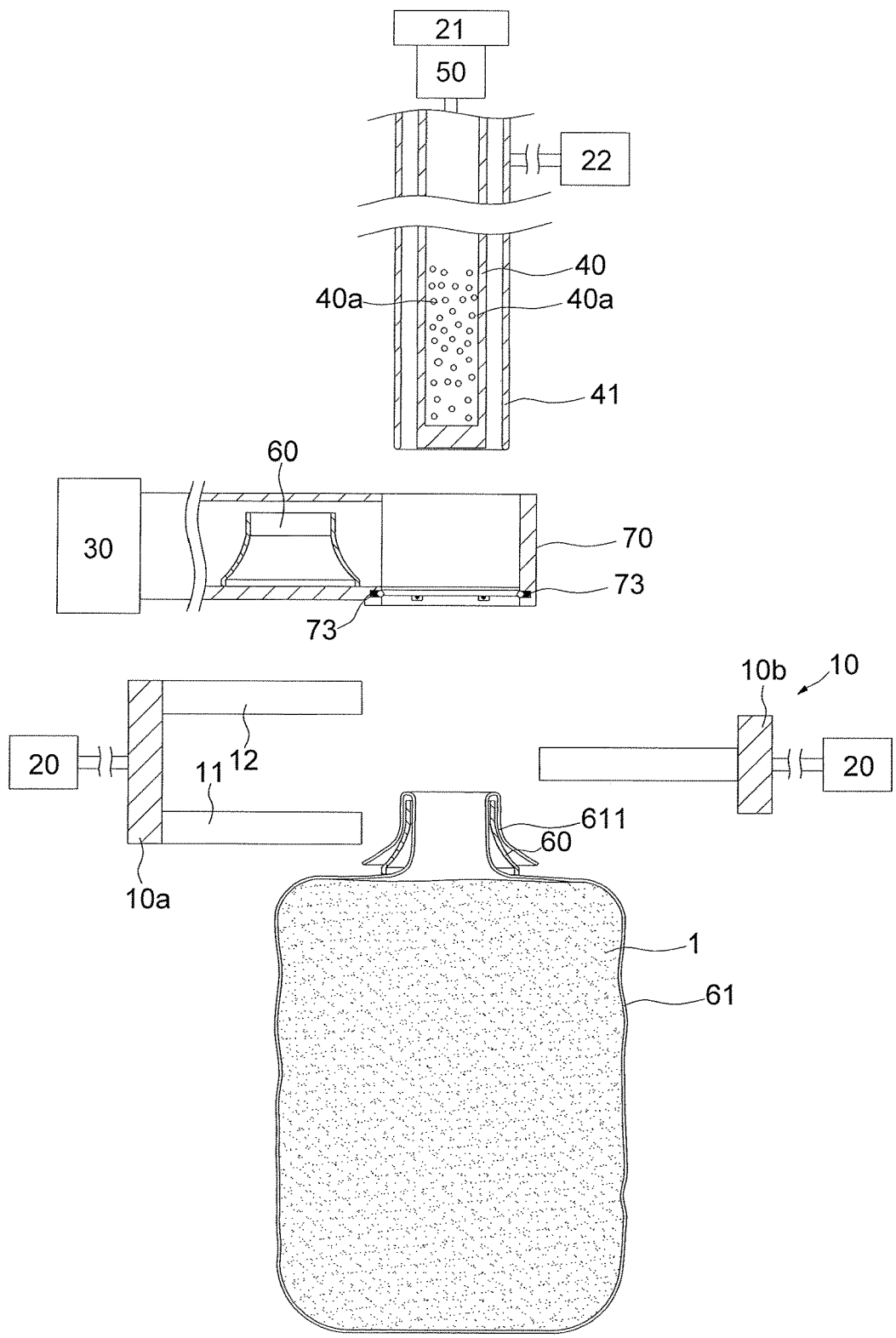
FIG. 8 is a first action status of the present invention.
Figure 9:
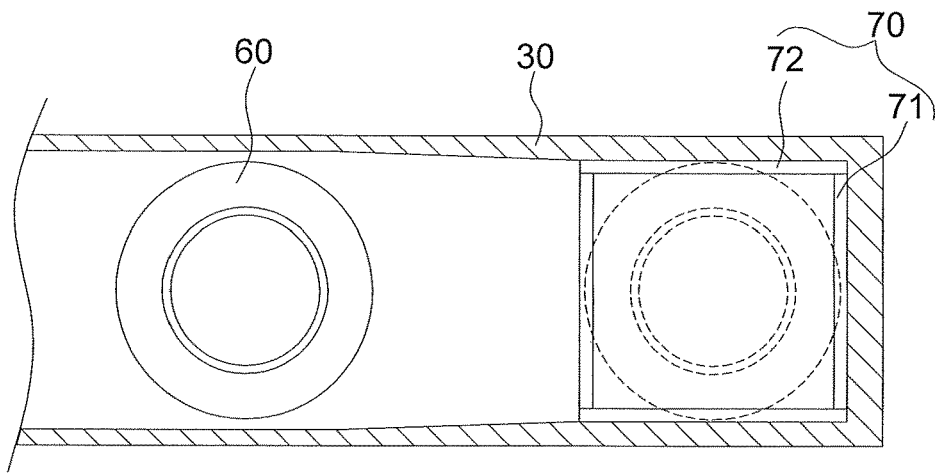
FIG. 9 is a first embodiment of the collar of the present invention.
Figure 10:
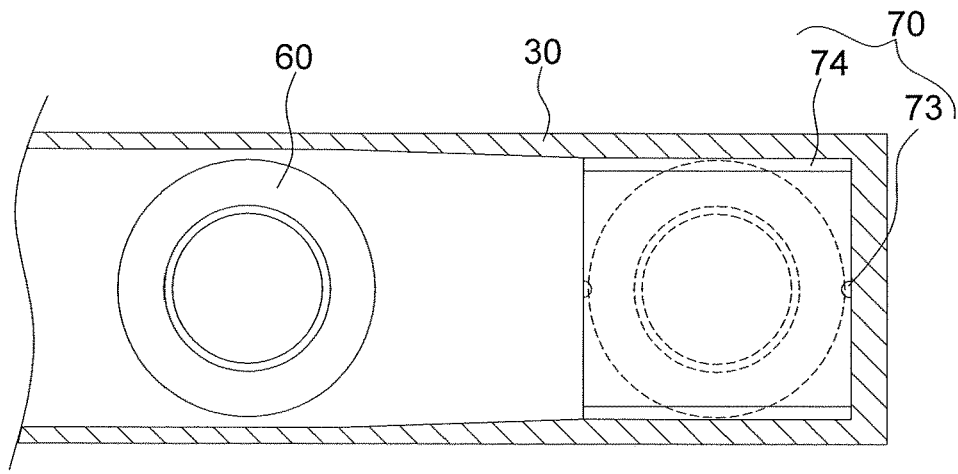
FIG. 10 is a second embodiment of the collar of the present invention.
Figure 11:
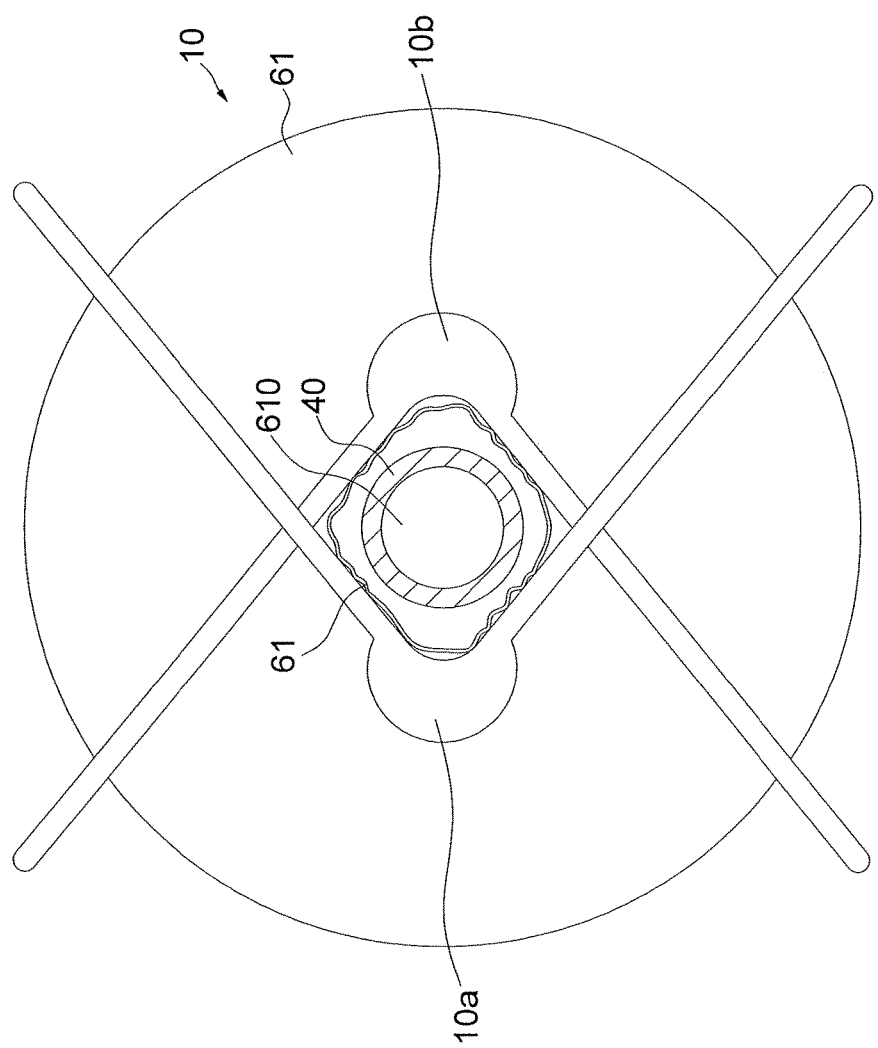
FIG. 11 is a close status of the two clamping seats of the present invention.

As shown in FIGS. 1 to 11, the present invention comprises opposing a first V-shaped clamping seat 10a and a second V-shaped clamping seat 10b, a first drive means 20, a second drive means 21, a third drive means 22, a transport means 30, an air duct 40, a tubular push rod 41 and a pumping means 50. The air duct 40 IS coaxially movably received in the tubular push rod 41, a gap 400 is defined between an inner periphery of the tubular push rod 41 and an outer periphery of the air duct 40 (referring to FIG. 4). The first drive means 20 is for driving the first and second clamping seats 10a, 10b to mutually open or close.

The transport means 30 is for supplying the collar 60 into to the interior of the ring seat 70. The wall of the air duct 40 has a plurality of pores 40a. The pumping means 50 is for driving the plurality of pores 40a of the air duct 40 to inhale or exhaust. The push rod 41 accommodates the air duct 40. The third drive means 22 is for driving the push rod 41 up or down along the axial direction of the air duct 40.

The bag 61 filled with culture medium 1 is delivered to the position between the first and the second clamping seat 10a, 10b, and the top portion 611 of the bag 61 is located between the first and the second clamping seats 10a, 10b. The transport means 30 transmits the tubular collar 60 into the internal of the ring seat 70. The third drive means 22 drives the air duct 40 to extend out from a bottom end of the tubular push rod 41, through an axial through hole 600 of the collar 60 and into the interior of a top portion of the bag 61 from the opening 610 of the top portion 611 of the bag 61. The first drive means 20 drives the first and second clamping seats 10a, 10b to close to each other, so that the top portion 611 of bag 61 shrinks and close to the outer surface of the air duct 40, and the pumping means 50 actuates the plurality of pores 40a to inhale so as to suck the inner wall of the top portion 611 of the bag 61, so that an outer diameter of the top portion 611 of the bag 61 sucked by the air duct 40 is smaller than an inner diameter of the axial through hole 600 of the tubular collar 60 (referring to FIGS. 3 and 4). When the air duct 40 sucks the bag 61 by inhale of the plurality of pores 40a, the first drive means 20 drives the first and second clamping seats 10a, 10b to open with respect to each other, and the third drive means 22 actuates the push rod 41 to move down to push down the collar 60 to sleeve on the top portion 611 of the bag 61 sucked by the air duct 40 so that the top portion 611 of the bag 61 penetrates the axial through hole 600 of the tubular collar 60 and positions above a top of the tubular collar 60. Wherein an inner diameter of the tubular push rod 41 is bigger than an outer diameter of a top portion 601 of the tubular collar 60, a width of the gap 400 is bigger than a thickness of the top portion of the tubular collar 60 (referring to FIG. 4). When the collar 60 sleeves on the top portion 611 of the bag 61, the pumping means 50 actuates the plurality of pores 40a to exhaust so as to blow the top portion 611 of the bag 61 to open. When the top portion 611 of the bag 61 opens to have a diameter being bigger than an outer diameter of the push rod 41, the third drive means 22 actuates the push rod 41 further decline to push the top portion 611 of the bag 61 to fold down to envelop an outer periphery of the tubular collar 60, and the top portion 601 of the tubular collar 60 is positioned between the tubular push rod 41 and the air duct 40 (referring to FIG. 7). When the top portion 611 of the bag 61 folds down, the second drive means 21 and the third drive means 22 drive the air duct 40 and the push rod 41 to rises, and then the process of the package completes automatically.

As shown in FIGS. 1 to 11, the ring seat 70 is shaped in a piper with a cross section in square, has two first opposite walls with a first rib 71 defined thereon and two second opposite walls with a second rib 72 defined thereon for supporting the peripheral edge of the bottom of the collar 60.

When the push rod 41 moves down to push the collar 60, the collar 60 is deformed by the first rib 71 and the second rib 72 to pass through the first rib 71 and the second rib 72 and drop down to sleeve on the top portion 611 of the bag 61.

As shown in FIGS. 1 to 11, the ring seat 70 is shaped in a piper with a cross section in square, has two first opposite walls with a L-shaped elastic plate 73 defined thereon and two second opposite walls with an elastic ball 74 defined thereon for supporting the peripheral edge of the bottom of the collar 60. When the push rod 41 moves down to push the collar 60, the collar 60 overcomes the elastic force of the L-shaped elastic plate 73 and the elastic force of the elastic ball 74 to pass through the L-shaped elastic plate 73 and the elastic ball 74 and drop down to sleeve on the top portion 611 of the bag 61.

As shown in FIGS. 1 to 11, the first V-shaped clamping seat 10a includes a V-shaped upper clamp jaw 11 and a V-shaped lower clamp jaw 12. When the first V-shaped clamping seat 10a and the second V-shaped clamping seat 10b clamp and close to each other, the V-shaped upper clamp jaw 11 and the V-shaped lower clamp jaw 12 position on the top and the bottom of the second V-shaped clamping seat 10b respectively, so as to shrink the top portion 611 of the bag 61.

While we have shown and described the embodiment in accordance with the present invention, it should be clear to those skilled in the art that further embodiments may be made without departing from the scope of the present invention.

What is claimed is:

1. A bag packing mechanism for mushroom cultivation comprising:
    a first V-shaped clamping seat; the first V-shaped clamping seat including a V-shaped upper clamp jaw and a V-shaped lower clamp jaw;
    a second V-shaped clamping seat;
    a first drive means for driving the first and second clamping seats to mutually open or close;
    an air duct;
    a tubular push rod, the air duct being coaxially movably received in the tubular push rod, a gap being defined between an inner periphery of the tubular push rod and an outer periphery of the air duct;
    a second drive means for driving the air duct up or down;
    a third drive means for driving the tubular push rod up or down;
    a transport means for supplying a tubular collar into an interior of a ring seat, wherein the ring seat being shaped in a piper with a cross section in square and having two first opposite walls with a L-shaped elastic plate defined thereon and two second opposite walls with an elastic ball defined thereon for supporting a peripheral edge of a bottom of the tubular collar; and
    a pumping means for actuating a plurality of pores of the air duct to inhale or exhaust;
    wherein, when a bag filled with a specific amount of culture medium for cultivating mushroom is delivered to the position between the first and the second clamping seats, the transport means supplies the tubular collar into the interior of the ring seat, the third drive means drives the air duct to extend out from a bottom end of the tubular push rod, through an axial through hole of the tubular collar and into an interior of a top portion of the bag from an opening of the top portion of the bag, the first drive means drives the first and second clamping seats to close to each other, the V-shaped upper clamp jaw and the V-shaped lower clamp jaw position on a top and a bottom of the second V-shaped clamping seat respectively so as to shrink the top portion of the bag to close to an outer surface of the air duct, and the pumping means actuates the plurality of pores to inhale so as to suck an inner wall of the top portion of the bag, so that an outer diameter of the top portion of the bag sucked by the air duct is smaller than an inner diameter of the axial through hole of the tubular collar; wherein when the air duct sucks the bag by inhale of the plurality of pores, the first drive means drives the first and second clamping seats to open with respect to each other, and the third drive means actuates the tubular push rod to move down to push down the tubular collar; wherein when the tubular push rod moves down to push the tubular collar, the tubular collar overcomes an elastic force of the L-shaped elastic plate and an elastic force of the elastic ball to pass through the L-shaped elastic plate and the elastic ball and drop down to sleeve on the top portion of the bag sucked by the air duct so that the top portion of the bag penetrates the axial through hole of the tubular collar and positions above a top of the tubular collar; wherein when the tubular collar sleeves on the top portion of the bag and the top portion of the bag penetrates the axial through hole of the tubular collar and positions above the top of the tubular collar, the pumping means actuates the plurality of pores to exhaust so as to blow the top portion of the bag to open; wherein an inner diameter of the tubular push rod being bigger than an outer diameter of a top portion of the tubular collar, a width of the gap being bigger than a thickness of the top portion of the tubular collar, when the top portion of the bag opens to have a diameter being bigger than an outer diameter of the tubular push rod, the third drive means actuates the tubular push rod to further decline to push the top portion of the bag to fold down to envelop an outer periphery of the tubular collar, and the top portion of the tubular collar is positioned between the tubular push rod and the air duct; and wherein when the top portion of the bag folds down, the second drive means and the third drive means drive the air duct and the tubular push rod to rise.

2. A method for bag packing for mushroom cultivation comprising:
    providing a bag packing mechanism comprising a first V-shaped clamping seat, a second V-shaped clamping seat, a first drive means for driving the first and second clamping seats to mutually open or close, an air duct, a tubular push rod, a second drive means for driving the air duct up or down, a third drive means for driving the tubular push rod up or down, a transport means for supplying a tubular collar into an interior of a ring seat, and a pumping means for actuating a plurality of pores of the air duct to inhale or exhaust; the first V-shaped clamping seat including a V-shaped upper clamp jaw and a V-shaped lower clamp jaw; the air duct being coaxially movably received in the tubular push rod, a gap being defined between an inner periphery of the tubular push rod and an outer periphery of the air duct; wherein the ring seat being shaped in a piper with a cross section in square and having two first opposite walls with a L-shaped elastic plate defined thereon and two second opposite walls with an elastic ball defined thereon for supporting a peripheral edge of a bottom of the tubular collar; wherein an inner diameter of the tubular push rod being bigger than an outer diameter of a top portion of the tubular collar, a width of the gap being bigger than a thickness of the top portion of the tubular collar;

after a bag filled with a specific amount of culture medium for cultivating mushroom being delivered to the position between the first and the second clamping seats, the transport means supplying the tubular collar into the interior of the ring seat, the third drive means driving the air duct to extend out from a bottom end of the tubular push rod, through an axial through hole of the tubular collar and into an interior of a top portion of the bag from an opening of the top portion of the bag, the first drive means driving the first and second clamping seats to close to each other, the V-shaped upper clamp jaw and the V-shaped lower clamp jaw position on a top and a bottom of the second V-shaped clamping seat respectively so as to shrink the top portion of the bag to close to an outer surface of the air duct, and the pumping means actuating the plurality of pores to inhale so as to suck an inner wall of the top portion of the bag, so that an outer diameter of the top portion of the bag sucked by the air duct is smaller than an inner diameter of the axial through hole of the tubular collar;

when the air duct sucks the bag by inhale of the plurality of pores, the first drive means drives the first and second clamping seats to open with respect to each other, and the third drive means actuates the tubular push rod to move down to push down the tubular collar; wherein when the tubular push rod moves down to push the tubular collar, the tubular collar overcomes an elastic force of the L-shaped elastic plate and an elastic force of the elastic ball to pass through the L-shaped elastic plate and the elastic ball and drop down to sleeve on the top portion of the bag sucked by the air duct so that the top portion of the bag penetrates the axial through hole of the tubular collar and positions above a top of the tubular collar;

when the tubular collar mounts on the top portion of the bag and the top portion of the bag penetrates the axial through hole of the tubular collar and positions above the top of the tubular collar, the pumping means actuates the plurality of pores to exhaust so as to blow the top portion of the bag to open;

when the top portion of the bag opens to have a diameter being bigger than an outer diameter of the tubular push rod, the third drive means actuates the tubular push rod to further decline to push the top portion of the bag to fold down to envelop an outer periphery of the tubular collar, and the top portion of the tubular collar is positioned between the tubular push rod and the air duct; and when the top portion of the bag folds down, the second drive means and the third drive means drive the air duct and the tubular push rod to rise, and finally the bag packaging with culture medium and tubular collar is finished.

\* \* \* \* \*